United States Patent
Ciotti et al.

(10) Patent No.: US 7,156,212 B1
(45) Date of Patent: Jan. 2, 2007

(54) PISTON FOR CYLINDER AND PISTON UNIT OF DISC BRAKE

(76) Inventors: Alessandro Ciotti, Via R. Sanzio, 5 I-24036 Ponte San Pietro, Bergamo (IT); Johannes Agostini, c/o Freni Brembo S.p.A. Via Brembo, 25 I-24035 Curno, Bergamo (IT); Matthias Leber, c/o Daimlerchrysler AG, D-71059 Sindelfingen (DE)

( * ) Notice: Subject to any disclaimer, the term of this patent is extended or adjusted under 35 U.S.C. 154(b) by 630 days.

(21) Appl. No.: 10/110,259

(22) PCT Filed: Oct. 4, 2000

(86) PCT No.: PCT/EP00/09709

§ 371 (c)(1),
(2), (4) Date: Apr. 8, 2002

(87) PCT Pub. No.: WO01/27489

PCT Pub. Date: Apr. 19, 2001

(30) Foreign Application Priority Data

Oct. 8, 1999 (EP) .................................. 99830633

(51) Int. Cl.
*F16D 55/18* (2006.01)
(52) U.S. Cl. .................................. 188/72.4; 188/73.37
(58) Field of Classification Search .............. 188/72.4, 188/370, 72.5, 73.37, 217, 264 R, 250 E, 188/218 A, 264; 92/129, 84, 187–191
See application file for complete search history.

(56) References Cited

U.S. PATENT DOCUMENTS

| 2,888,103 | A | * | 5/1959 | Armstrong | ................. 188/72.4 |
| 3,890,884 | A | | 6/1975 | Silberschlag | .................... 92/84 |
| 4,222,463 | A | * | 9/1980 | Domes et al. | ............. 188/72.3 |
| 4,605,104 | A | * | 8/1986 | Thompson | ................. 188/72.4 |
| 5,014,827 | A | | 5/1991 | Wang et al. | ................. 188/724 |
| 5,031,511 | A | * | 7/1991 | Villata | ......................... 92/128 |

FOREIGN PATENT DOCUMENTS

| EP | 595704 A | 5/1994 |
| FR | 1101244 | 10/1955 |
| FR | 1390274 | 6/1965 |
| JP | 10-267058 | * 10/1998 |
| JP | 11-30258 | * 2/1999 |

OTHER PUBLICATIONS

European search report dated Dec. 11, 2000.
International Preliminary Examination Report.

* cited by examiner

*Primary Examiner*—Melanie Torres
(74) *Attorney, Agent, or Firm*—Sofer & Haroun, LLP.

(57) ABSTRACT

A piston (30) for a cylinder and piston unit (24) of a disc brake (10), with a novel capability of damping the vibrations induced by a braking action, comprising a body (32) and a head (34) designed to come into contact with a pad (20) to act on a braking strip (13) of a disc (12), a damping element provided between the head (34) and the body (32) of the piston (30), in which the head (34) and the body (32) comprise, respectively, a stem (62) and a recess (41) for the stem (62), forming a gap (64) for the damping element.

20 Claims, 3 Drawing Sheets

PISTON FOR CYLINDER AND PISTON UNIT OF DISC BRAKE

The present invention relates to a piston for a cylinder and piston unit of a disc brake, particularly, but not exclusively, designed for disc brakes for application to motor vehicles.

A known piston for a cylinder and piston unit, comprising a body and a head designed to come into contact with a pad to act on a braking strip of a disc.

It is also known that pistons of the type indicated above press the pads against annular braking strips of the disc to generate a requisite braking action, for stopping a vehicle, for example. When pressed against the braking strip of the disc during braking, the pads are stressed by the disc with a force directed tangentially to the disc, this force being opposed to achieve the desired braking effect. For this reason, the pads come to bear on supports provided in the caliper, which react against the tangential forces.

As is also known, vibrations may occur in the disc brake during this braking action. These vibrations of the disc brake are manifested in the form of screeching which is in itself annoying.

The problem to which the present invention relates is that of proposing a piston for a cylinder and piston unit of a disc brake which has structural and functional characteristics such that the aforesaid disadvantages cited with reference to the prior art are overcome.

This problem is resolved with a piston for a cylinder and piston unit of the type specified above, characterized in that it comprises a damping element between the head and the body of the piston.

Further characteristics and the advantages of the piston for a cylinder and piston unit of a disc brake according to the invention will be made clear by the following description of a preferred embodiment of the invention, provided for guidance and without limiting intent with reference to the attached figures, in which.

Figure 1:
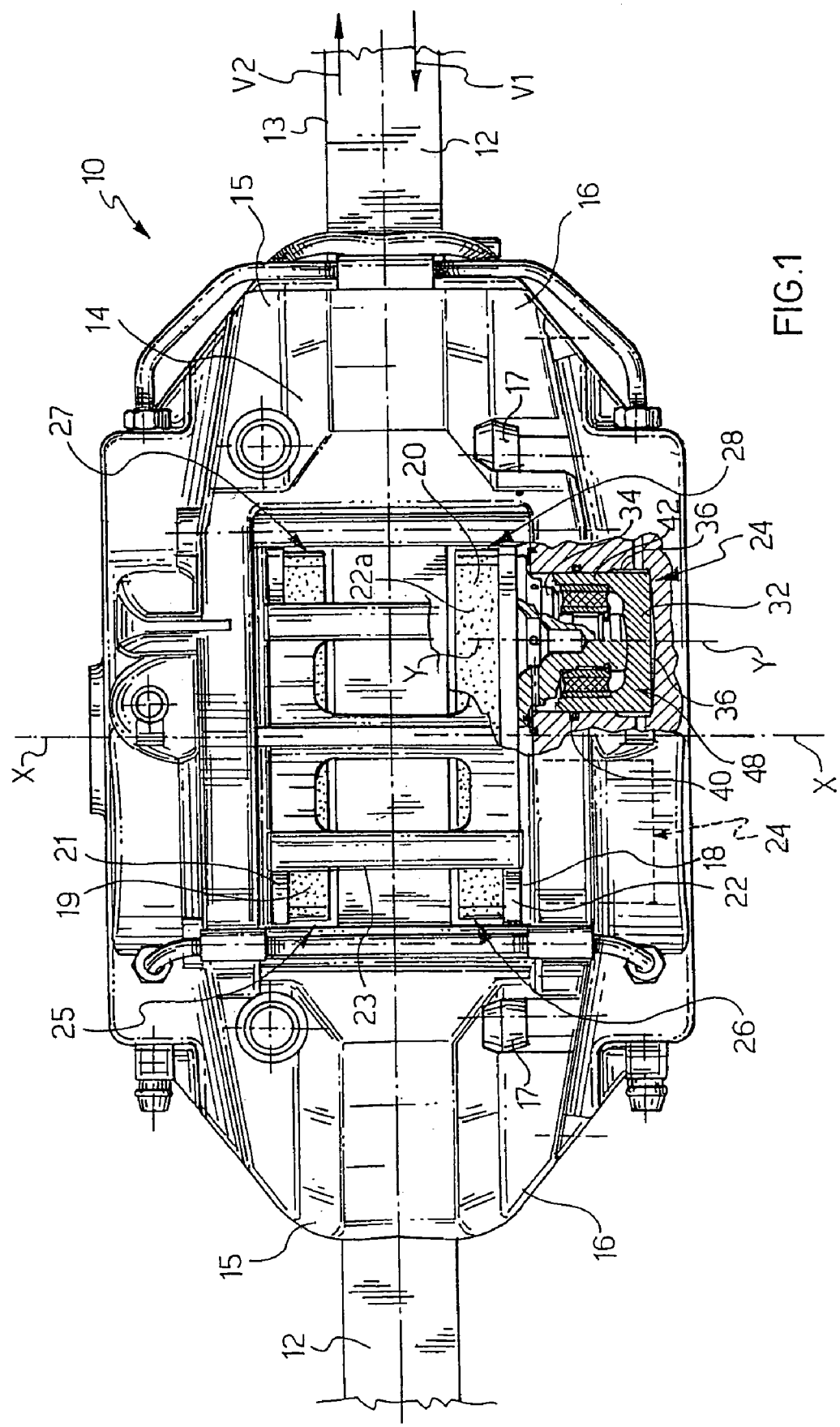
FIG. 1 shows a schematic view of a disc brake from above and in partial section.

With reference to the aforesaid figures, the number 10 represents the whole of a disc brake, particularly suitable for a high-performance vehicle. The disc brake comprises a disc 12, having an annular braking strip 13 with the axis X—X.

The disc brake 10 also comprises a caliper housing 14, which extends on both sides of the braking strip 13 of the disc 12.

During the forward running of the vehicle, the braking strip 13 moves inside the caliper housing 14 in a direction V1. During reverse running, however, the strip 13 moves in a direction indicated by V2, opposite to V1.

The housing of the caliper 14 is formed by two half-housings 15 and 16, produced by casting from a suitable aluminum alloy, the half-housings being juxtaposed on a plane perpendicular to the axis X—X, and being fixed to each other by means of screws 17.

Sockets 18 for receiving the pads 19,20, located on opposite sides of the strip 13, are formed in the housing 14.

The pads 19, 20 comprise steel plates 21, 22 respectively, and friction linings 21a and 22a respectively, made from a material having a high coefficient of friction, the linings 21a and 22a being supported stably by the plates 21, 22, and being in direct contact with the faces of the braking strip 13 during the braking action.

The pads 19 and 20 are prevented from falling out by conventional retaining means 23, comprising pins extending through slotted holes formed in the plates 21, 22.

Two opposing pairs of cylinder and piston units 24, mounted in the half-housings 15, 16, are active during the braking action to press the pads 19, 20 against the corresponding faces of the braking strip 13, as will be described in greater detail below.

As a result of a braking action in forward running, the braking strip 13 exerts a force directed tangentially to the disc, as shown by the arrow V1, on the pads 19 and 20. The disc brake 10 comprises a support 25 (26) in the caliper housing 14 to retain the pad 19 (20).

To retain the pad 19 (20) following a braking action in reverse running, which exerts a force in the direction shown by the arrow V2, the disc brake 10 comprises a further support 27 (28).

The aforesaid braking actions are generated by supplying working fluid to the cylinder and piston unit 24 by means of a conventional hydraulic brake circuit.

The shapes and diameters of the cylinder and piston units 24 are identical or proportional to each other, and therefore only one of these units is described in detail below.

A piston 30 for a cylinder and piston unit 24 comprises a body 32, or operating part of the piston, interacting with a head 34, or thrust part of the piston, designed to come into contact with the plate 22 of the pad 20. The body 32 is fitted in a fluid-tight way in a cylinder 36, formed in the half-housing 16 of the caliper 15, forming a thrust chamber 38. The body 32 of the piston 30, guided by the cylinder 36, can slide along the axis Y—Y of the latter under the action of the working fluid present in the thrust chamber 38. Tightness with respect to the working fluid is provided by sealing means 40, such as a ring seal, housed in a channel of the cylinder wall and acting on the body 32 of the piston (FIG. 1).

Figure 2:
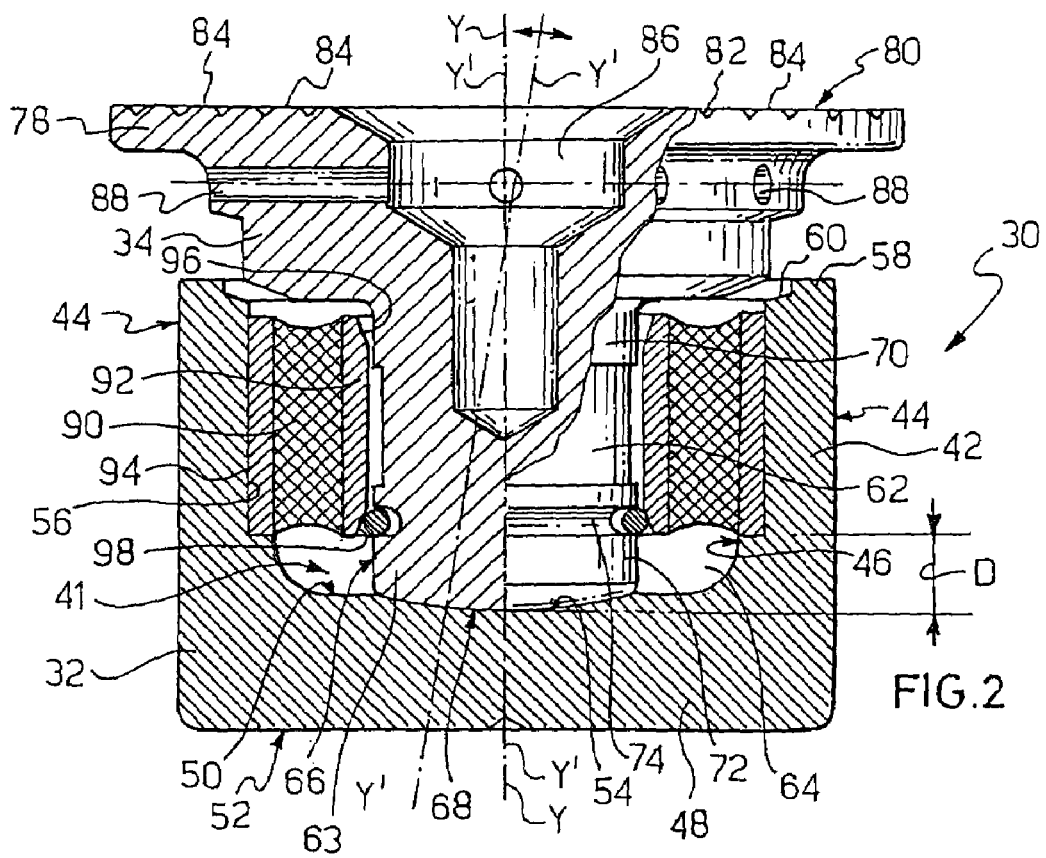
FIG. 2 shows a view in partial section of a piston for a cylinder and piston unit of the disc brake in FIG. 1.

In one embodiment of the invention, the body 32 of the piston is cup-shaped. Thus a body 32 of the piston having a recess 41, or in other words an inner chamber, facing the pad 19, is provided. The cup-shaped body 32 has an annular lateral wall 42 provided with an outer surface 44, designed to slide in the cylinder 36, and an inner surface 46, laterally delimiting the recess 41, together with a base 48, arranged so that it closes the annular lateral wall 42 at its end opposite the pad 19. The base 48 has an inner surface 50, delimiting the recess 41, and an outer surface 32, designed to receive the thrust action of the working fluid present in the thrust chamber 38. In a particular embodiment of the invention, the cup-shaped body 32 is cylindrical and has a recess 41 whose depth is approximately equal to the diameter of the recess 41 (FIG. 2).

In the inner surface 50 of the base 48 there is provided a bowl-shaped seat 54, for example a seat 54 in the form of a spherical bowl-shaped hollow. An annular channel or seat 56 is formed in the inner surface 46 of the lateral 42, and is preferably located near the free end 58 of the lateral wall 42, at a predetermined distance (D) from the base 48. The end 58 has an annular flaring or channel 60 at the inner edge of the cup-shaped body 32, designed to widen the entry of the recess 41 of the cup-shaped body 32. Said body 32 is preferably made from metallic material, for example aluminum.

The head 34 of the piston comprises a stem 62 designed to be housed in the recess 41 of the cup-shaped body 32. The stem 62 is housed in the recess 41 of the cup-shaped body 32 in such a way as to form a gap 64 between its lateral surface 66 and the inner surface 46 of the lateral wall 42 of the cup-shaped body 32. For example, the stem 62 of the head 34 is cylindrical and has an external diameter equal to half the diameter of the cylindrical recess 41, and the gap 64 has a width equal to half the diameter of the stem 62 of the head 34.

The stem 62 is in contact with the cup-shaped body 32. The contact between the head and the cup-shaped body 32 is provided by making the free end 63 of the stem bear on the base 48 of the cup-shaped body 32. For example, the free end 63 of the stem is shaped in the form of a dome 68, and in particular is shaped in the form of a spherical dome 68. The spherical dome 68 is housed in the bowl-shaped seat 54 provided on the base 48 of the cup-shaped body 32, and preferably the end 63 of the stem and the bowl-shaped seat 54 of the base 48 have conjugate surfaces. The end 63 and said bowl-shaped seat 54 form a joint, and in particular a ball joint, between the body 32 and the bead 34 of the piston. The joint allows the head 34 to be made to oscillate with respect to the cup-shaped body 32. In particular, because of the presence of the joint, the axis Y'—Y' of the stem 62, and consequently of the head 34, can be orientated in a different direction from that defined by the axis Y—Y of the cup-shaped body 32.

The stem is also provided with annular projections 70, 72 which delimit a free portion of the stem. The annular projections 70, 72 have end surfaces aligned with each other in such a way as to form a support and a guide. Retaining or snap-fitting means are provided at a predetermined distance (D) from the free end 63 of the stem, and preferably at a distance (D) equal to the distance (D) from the base at which the seat 56 is formed in the wall of the cup-shaped body 32. For example, a circumferential channel 74 is provided, to form a seat capable of housing an elastic wire ring 76. In operating conditions, the elastic ring 76 partially projects from the annular channel 74.

In one embodiment of the invention, the head 34 of the piston 30 is mushroom-shaped and its top consists of a dish 78. The dish 78 is provided externally with a thrust surface 80 designed to interact with the plate 22 of the pad 20. A plurality of channels 82, commonly known as scores, is formed in the thrust surface 80 and divides thrust surface 80 into portions or areas 84 separated from each other and designed to bear on the plate 22. For example, the scores are formed by parallel channels 82, or, alternatively, by concentric circumferential channels. The head 34 is internally hollow. For example, a blind hole 86 passing through a considerable part of the head 34 is provided, coaxial with the axis Y'—Y' of the head 34. For example, the blind hole 86 extends within the stem 62 to a point near the spherical bowl 68. The blind hole 86 has portions of different diameters, decreasing progressively from the dish portion 78 of the head 34 to the stem portion of the head 34. The aforesaid shaping of the cavity of the head 34 makes it possible to have a large surface of the cavity without reducing the resistance of the head 34 to the thrust imparted by the cup-shaped body 32 and transmitted to the pad 20. A plurality of radially positioned through holes 88 is provided in the head 34, near the dish 78. For example, the plurality of through holes 88 puts the exterior of the head 34 into communication with the internal cavity 86. Preferably, the through holes 88 are equally spaced from each other.

The head 34 is made from metallic material, for example from titanium or preferably steel.

Advantageously, a damping element is housed in the gap present between the stem 62 of the head 34 and the lateral wall 42 of the cup-shaped body 32. The term "damping element" denotes an element capable of damping the vibrations induced in the head 34 of the piston 30 by a braking action. For example, a ring 90 of damping material, such as a synthetic material or a natural rubber, or a material generally known for making anti-vibration or silent block supports, is housed in the gap 64. In one embodiment of the invention, a ring of EPDM or, alternatively, of synthetic silicone-based material, such as the material commonly known as VITON, is housed in the gap 64.

More advantageously, the damping ring 90 is associated with an inner lining 92, on the surface in contact with the stem, and an outer lining 94, on the surface in contact with the cup-shaped body 32. For example, the linings 92, 94 are concentric metal bushes on whose opposing surfaces the damping ring 90 is fixed. The damping ring 90 is advantageously housed in the gap by force fitting. In particular, the outer lining 94 is housed in the annular seat 56 provided in the lateral wall 42 of the cup-shaped body 32 and the inner lining 92 is supported by the annular projections 70, 72 of the stem 62. The inner lining 92 is tapered from the central portion to the ends or, in other words, has flarings 96, 98 on the edges fading the stem 62. When in the operating position, the damping ring 90 bears on the elastic wire ring 76 which partially projects from the circumferential channel 74 of the stem 62.

Advantageously, the damping ring 90 has a height equal to the width or diameter of the stem 62 and a width at least equal to half the width of the stem 62.

The assembly and operation of a piston for a cylinder and piston unit of a disc brake according to the present invention is described below.

For the assembly of the piston 30, the cup-shaped body 32 and the damping ring 90 are first fitted together. The damping ring 90 is inserted into the recess 41 of the cup-shaped body 32, the outer lining 94 being forced into the seat 56 provided in the lateral wall 42. This operation is facilitated by the provision of the flaring 60 at the entry of the recess 41 of the cup-shaped body 32. When the damping ring 90 has been inserted, the head 34 of the piston 30 is fitted. The stem 62 is inserted into the inner lining 92 until the end 63 shaped in the form of a spherical dome 68 is brought into contact with the bowl-shaped seat 54 in the base 48 of the cup-shaped body 32. In other words, the annular projections 70, 72 slide on the inner lining 92 until the end 63 of the stem 62 shaped in the form of a spherical dome 68 is settled in the seat 54 located on the base 48 of the cup-shaped body 32. This operation is facilitated by the provision of the flarings 96, 98 of the inner lining 92 which allows the lining 92 to be slid on the annular projections 70, 72 of the stem 62. The flaring 96 provided in the inner lining 92 also allows the elastic wire ring 76 to be moved completely within the circumferential channel 74 during the sliding of the stem 62 in the damping ring 90. When the stem has been brought into the operating position, the damping ring 90 is positioned beyond the circumferential channel 74, as a result of the provision of the circumferential channel 74 at a distance (D) from the end 63 of the stem 62 equal to the distance (D) of the seat 56–for the damping ring 90 from the base 48, in such a way as to allow the elastic wire ring 76 to emerge from the channel 74 to form a stop and bearing element which prevents the stem 62 from falling out by snap-locking the stem 62 in the operating position. The piston 30 which is now assembled can then be housed in a conventional way in the cylinder 36 provided in the caliper housing 14 so that it can be pushed by the working fluid provided in the thrust chamber 38 against the pad 20.

During a braking action, the piston 30, pushed by the brake fluid, presses the pad 20 against the braking strip 13 of the disc 12, thus generating a braking action from which vibrations may arise. These vibrations from the pad are partially transmitted through the thrust surface of the dish to the head of the piston. As the head moves or vibrates relative to the body of the piston, it deforms the damping ring which damps the vibrations.

In other words, the energy present in the vibration transmitted from the pad to the piston head is partially dissipated by the damping ring, which, by damping, or in other words attenuating, the vibration of the pad and the vibration induced in the disc by the braking action, eliminates annoying screeches. The dimensions of the damping ring and its material are selected in such a way as to damp a vibration induced by a braking action and having a given frequency distribution.

As may be appreciated from the above description, the piston for a cylinder and piston unit of a disc brake according to the present invention makes it possible to meet the aforesaid requirement to damp the vibration induced by the braking action, and consequently to eliminate the annoying screeches produced during the braking action.

In particular, owing to the provision of a damping element interposed between the body and the head of the piston, it is possible to damp the vibrations produced during the braking action and transmitted to the caliper housing through the cylinder and piston unit.

Moreover, the mushroom-shaped piston head provided with a dish-shaped top enables the pressure exerted on the pad to be controlled precisely. In other words, the dish makes it possible to have a larger thrust surface or bearing area of the piston, enabling the pressure on the pad to be reduced and allowing the pad to be pressed uniformly against the braking strip of the disc.

Owing to the provision of a piston comprising a head and a cup-shaped body, and the provision of a hollow head, through ventilation holes, and the scores of the thrust surface of the dish, it is possible to obtain excellent thermal insulation. Thus the heat produced during the braking action and transmitted to the cylinder and piston unit is largely dissipated by the extended heat exchange surface of the head before it reaches the body of the piston and the fluid contained in the thrust chamber.

Owing to the limited contact provided between the stem of the head and body of the piston, it is also possible to obtain further thermal insulation of the piston body.

Since the contact between the head and body is provided by a spherical joint, the piston is made to exert its thrust action on the pad in an optimal way, even if there is a deformation of the caliper housing due to the braking action. The ball joint also makes it possible to have an optimal thrust, even if there is non-uniform wear of the friction lining, by making the pad position itself with the plate on a plane which is oblique with respect to the annular braking strip. This is because, in such a case, the piston head will be inclined with respect to the axis of the piston body, enabling the thrust surface to bear fully against the plate of the pad.

A further advantage of the invention lies in its novel structural simplicity, which enables it to be produced at a very low cost.

With particular advantage, the free end 63 of the stem 62 is shaped in the form of a dome 68 having a radius of a dimension sufficient to dispose a rotational centre or swing centre of the head 34 in proximity of the head end faced to the pad. For example, as shown in FIG. 2, the head swing centre is substantially disposed on the base of the dish 78. Due to this head swing centre arrangement, even small vibration amplitude of the dish are magnified by the stem, generating magnified vibration amplitude and magnified deformation of the dumping element, enabling an efficient vibration attenuation transferred to the cup-shaped body.

Clearly, variations and/or additions may be made to the invention described and illustrated above.

Figure 3:
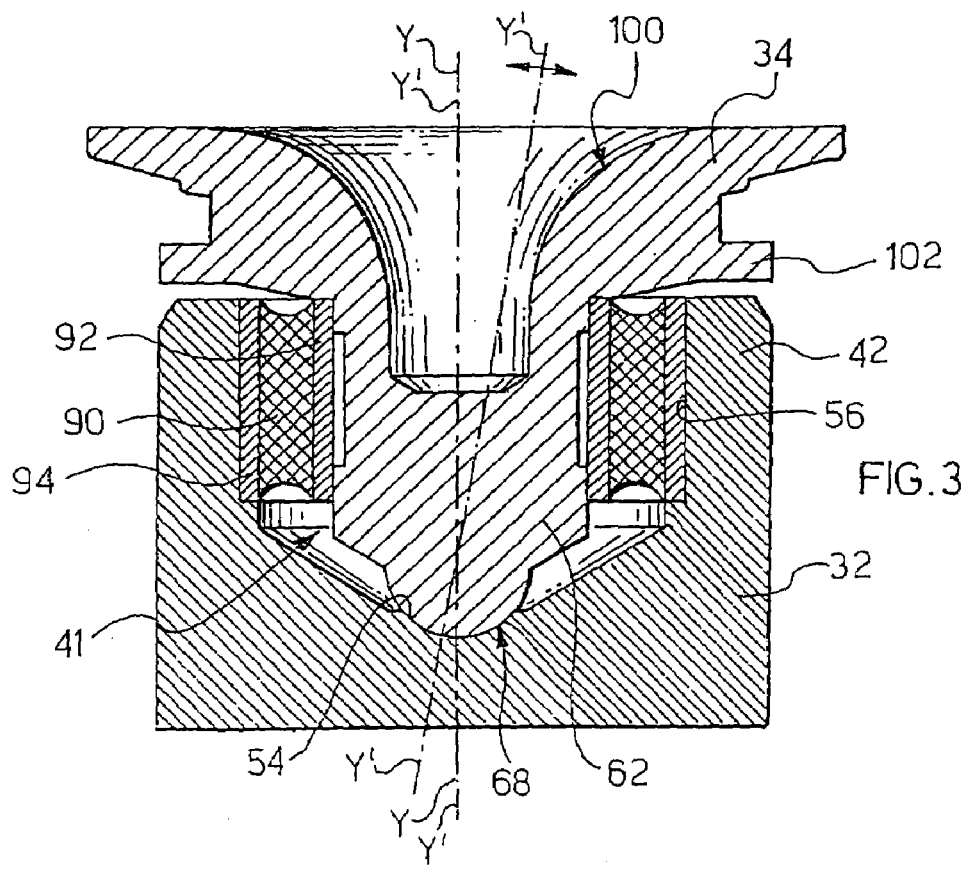
FIG. 3 shows a sectional view of a piston for a cylinder and piston unit of a disc brake according to a second embodiment of the invention.

As an alternative to what is shown in FIG. 2, the head 34 may be horn-shaped and the cavity 100 formed in it may be funnel-shaped (FIG. 3).

Figure 4:
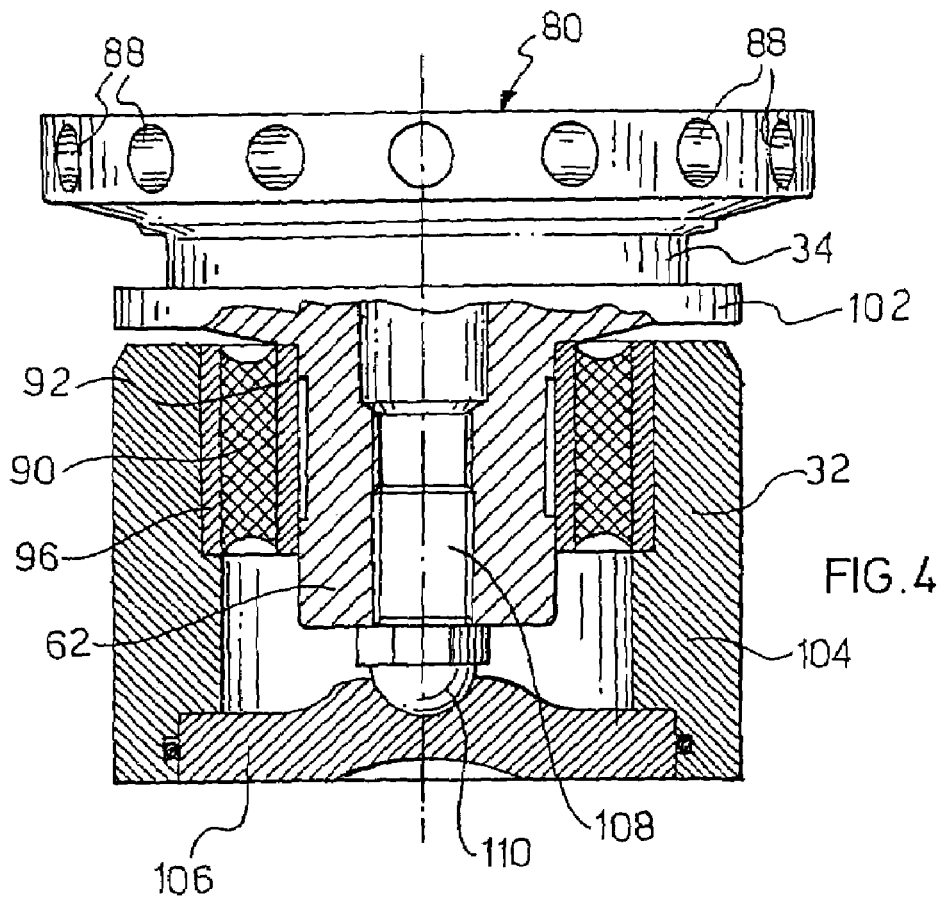
FIG. 4 shows a sectional view of a piston for a cylinder and piston unit of a disc brake according to a third embodiment of the invention.
Figure 5:
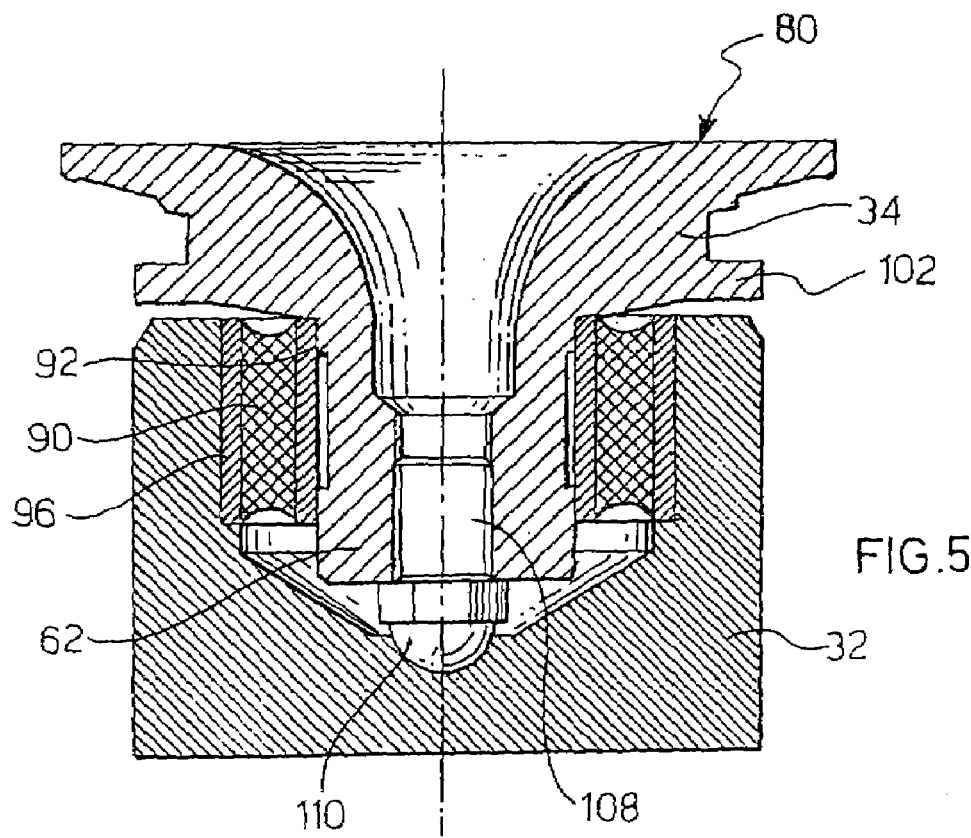
FIG. 5 shows a sectional view of a piston for a cylinder and piston unit of a disc brake according to a further embodiment of the invention.

To increase the surface of the head and consequently to increase the heat exchange surface, it is possible to provide fins 102 extending radially from the head 34 in the proximity of the dish or actually on the dish (FIGS. 3, 4 and 5).

As an alternative to a cup-shaped body 32, it is possible to provide a body 32 comprising a sleeve 104 closed by a base plate 106 (FIG. 4).

As an alternative to the end of the stem 62 shaped in the form of a spherical dome 68, it is possible to provide a threaded member 108 provided with a spherical head 110 (FIGS. 4 and 5).

A person skilled in the art may, in order to meet contingent and specific requirements, make numerous modifications and adaptations to the preferred embodiment of the piston for a cylinder and piston unit of a disc brake as described above, or replace elements with other functionally equivalent ones, without departing from the scope of the following claims.

The invention claimed is:

1. Piston for a cylinder and piston unit of a disc brake, said piston comprising:
   a body and a head, configured to move within said cylinder, designed to come into contact with a pad to act on a braking strip of a disc, said head having a stem and said body having a recess for said stem, wherein a gap for a ring damping element is disposed between said head and said body of said piston, wherein said ring is associated with linings on surfaces in contact with said stem and said body of said piston such that said ring guides and supports said stem by means of annular projections provided on said stem.

2. Piston according to claim 1, characterized in that the ring has a width equal to half that of the stem and a height equal to that of the stem.

3. Piston according to claim 1, characterized in that the said ring is made from synthetic material or natural rubber.

4. Piston according to claim 1, characterized in that said ring is made from EPDM or from silicone-based synthetic material.

5. Piston according to claim 1, characterized in that said ring is force-fitted into the gap.

6. Piston according to claim 1, characterized in that the ring is housed in an annular seat of the body of the piston.

7. Piston according to claim 1, characterized in that edges of one of said linings of the ring are reamed in such a way as to form a funnel shape for receiving the stem in the ring.

8. Piston according to claim 1, characterized in that said stem further comprises a contact between the stem and the body of the piston.

9. Piston according to claim 8, characterized in that said contact between the stem and body of the piston is provided by means of a ball joint.

10. Piston according to claim 1, characterized in that the body of the piston is made in the shape of a cup whose cavity is designed to receive the stem.

11. Piston according to claim 10, characterized in that said body of the piston in the shape of a cup further comprises a base in which is formed a seat designed to receive an end of the stem shaped in the form of a spherical dome.

12. Piston according to claim 11, characterized in that the body of the piston is a sleeve closed by a base plate.

13. Piston according to claim 11, characterized in that a threaded member with a spherical head is connected to the end of the stem.

14. Piston according to claim 1, characterized in that the end of the stem is mushroom-shaped and its top is comprised of a dish.

15. Piston according to claim 14, characterized in that the dish has an external thrust surface designed to interact with the pad.

16. Piston according to claim 15, characterized in that the external thrust surface is scored.

17. Piston according to claim 1, characterized in that the head is internally hollow.

18. Piston according to claim 17, characterized in that the hollow head is provided with a plurality of radial through holes.

19. Piston according to claim 14, characterized in that the head has radially extending fins.

20. A piston according to claim 1, wherein said piston of said cylinder and piston unit is within a caliper housing of a disk brake.

* * * * *